J. W. POST.
Key-Seat or Pinion-Cutter.
No. 208,492. Patented Oct. 1, 1878.
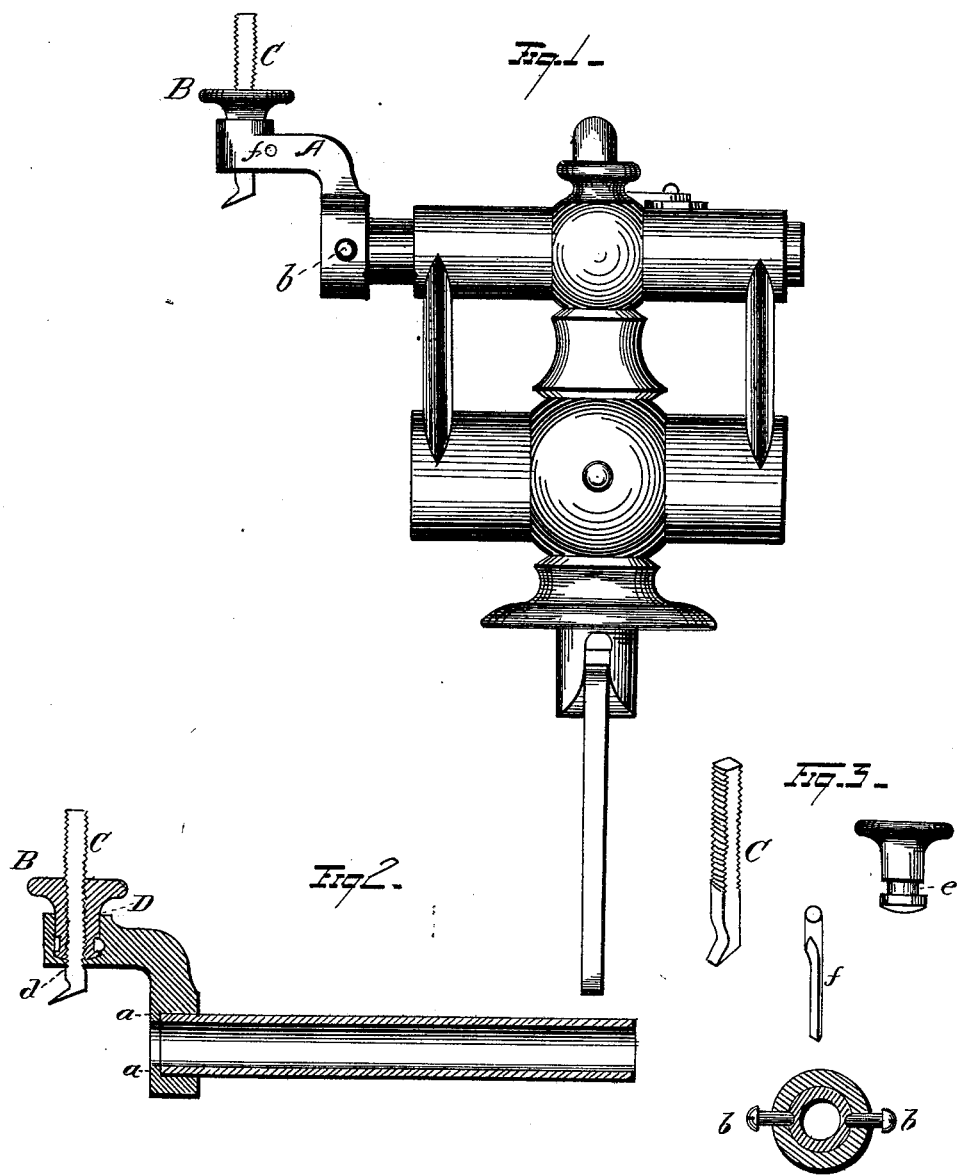

UNITED STATES PATENT OFFICE

JOHN W. POST, OF NEW YORK, N. Y., ASSIGNOR TO USEFUL MACHINERY COMPANY.

IMPROVEMENT IN KEY-SEAT OR PINION CUTTERS.

Specification forming part of Letters Patent No. 208,492, dated October 1, 1878; application filed March 7, 1878.

*To all whom it may concern:*

Be it known that I, JOHN W. POST, of New York, in the county of New York and State of New York, have invented certain new and useful Improvements in Key-Seat or Pinion Cutters; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of my invention is to make a pinion or key-seat cutter which may be readily and firmly attached to the sliding bar or mandrel of a lathe, and is so simple and effective in its operation that the most ordinary mechanic can work it successfully.

My invention consists of a holder whose form is that of an elbow, the lower portion of which is bored or recessed, so as to receive the end of a sliding bar or mandrel, to which it is to be attached like a collar, being prevented from moving backward by a shoulder left in the lower opening, and held firmly in position by two binding-screws, whose pointed ends fit in like apertures near the end of the mandrel. In the upper forward portion of this elbow-shaped holder is another recess or hole, bored at right angles to the one above described, through the lower portion of which is broached a square or rectangular opening, in which slides an adjustable cutter. In the upper part of this hole or recess is fitted a thumb or lever screw, through the threaded opening of which the cutter passes in its upward and downward movement, this screw being held in position by a pin passing through the elbow-shaped holder at right angles to this upper hole or seat. One-half of the diameter of this pin extends into an annular groove in said lever or thumb screw, thus holding it firmly in place, and at the same time permitting it to turn readily, in order to shift the position of the cutter.

In the accompanying drawings, Figure 1 represents a side view of my invention as applied to the mandrel of a lathe; Fig. 2, a longitudinal section of the invention, and Fig. 3 a view of the cutter and thumb-screw detached.

A is the elbow-shaped holder, the lower portion of which is bored or recessed, in order to receive the sliding bar or mandrel of a lathe. $a$ is a collar or flange, against which the end of the mandrel strikes, thereby preventing said mandrel from passing through the holder, which is held firmly in position by binding-screws $b\ b$, whose pointed ends fit in corresponding apertures made near the end of mandrel. The upper end of this elbow-shaped holder is also provided with a hole or recess, D, in the bottom of which is broached a square or rectangular opening, $d$, in which slides the adjustable cutter C, three sides of which are made square, the other being round, and with threads cut nearly its entire length. This cutter is operated by a lever or thumb screw, B, fitting into the recess D. Through the threaded opening of said screw the adjustable cutter moves upward and downward. This screw is provided with an annular groove, $e$, and is held, as said before, firmly in position by means of a pin, $f$, which passes through the holder A and groove $e$, and at the same time permits said screw to turn readily, so as to operate the cutter.

The application of this device is particularly adapted to hollow mandrels, through which a shaft can pass, thus enabling a workman to cut a key-seat or pinion at any portion of its length.

Hollow centers, for which a patent was granted to me December 18, 1877, enable the workman to hold a shaft or rod of any diameter.

Having thus described my invention, what I claim as new, and desire to secure by Letters Patent, is—

1. In combination with the hollow mandrel of a lathe, the elbow-shaped holder carrying a threaded cutter, operated by a lever or other suitable device, substantially as specified.

2. In a key-seat or pinion cutter, the combination of a hollow mandrel of a lathe with an elbow-shaped holder whose lower and upper ends are recessed or bored, the binding-screws for the purpose described, the adjustable threaded cutter, the lever or thumb screw, through which the cutter slides in its upward and downward movement, and the pin, all substantially in the manner and for the purposes specified.

In testimony that I claim the foregoing as my own I affix my signature in presence of two witnesses.

J. W. POST.

Witnesses:
   J. R. NOTTINGHAM,
   WILLIAM FITCH.